(12) United States Patent
Xiang et al.

(10) Patent No.: US 11,447,146 B2
(45) Date of Patent: Sep. 20, 2022

(54) VEHICLE CONTROL METHOD, APPARATUS AND SYSTEM, AND STORAGE MEDIUM

(71) Applicant: TENCENT TECHNOLOGY (SHENZHEN) COMPANY LIMITED, Shenzhen (CN)

(72) Inventors: Nan Xiang, Shenzhen (CN); Wei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 59 days.

(21) Appl. No.: 16/589,204

(22) Filed: Oct. 1, 2019

(65) Prior Publication Data

US 2020/0031363 A1 Jan. 30, 2020

Related U.S. Application Data

(63) Continuation of application No. PCT/CN2018/106707, filed on Sep. 20, 2018.

(30) Foreign Application Priority Data

Oct. 10, 2017 (CN) .......................... 201710936580.9

(51) Int. Cl.
*B60W 50/08* (2020.01)
*B60W 50/10* (2012.01)
*G05D 1/00* (2006.01)

(52) U.S. Cl.
CPC ........ *B60W 50/085* (2013.01); *B60W 50/082* (2013.01); *B60W 50/10* (2013.01); *G05D 1/0055* (2013.01)

(58) Field of Classification Search
None
See application file for complete search history.

(56) References Cited

U.S. PATENT DOCUMENTS 9,845,096 B2 12/2017 Urano et al.
2015/0088358 A1* 3/2015 Yopp .................. B60W 50/082
701/23

(Continued)

FOREIGN PATENT DOCUMENTS

CN 204989831 1/2016
CN 105523039 4/2016
(Continued)

OTHER PUBLICATIONS

Li, Xinghui, Remediation Device and Method for Mistaken Stepping on Automobile Accelerator Pedal, Nov. 8, 2017, WIPO, Machine Translation. (Year: 2017).*

(Continued)

*Primary Examiner* — James J Lee
*Assistant Examiner* — Tawri M Matsushige
(74) *Attorney, Agent, or Firm* — ArentFox Schiff LLP (57) ABSTRACT

This application relates to the field of self-driving car technologies. In a vehicle control method, first control behavior information is obtained, by processing circuitry of a vehicle, via a vehicle-mounted sensor system in a case that the vehicle is in an autonomous control mode. The first control behavior information is generated from a first user action performed on the vehicle. Whether the first control behavior information corresponds to a predetermined type of control behavior information is determined by the processing circuitry. The predetermined type of control behavior information corresponds to a user action type that is triggered by a reflex of a user. A switch, by the processing circuitry, is performed from the autonomous control mode to a manual control mode in a case that the first control behavior information is not determined as the predetermined type of control behavior information.

15 Claims, 5 Drawing Sheets

(56) References Cited

U.S. PATENT DOCUMENTS

| | | | |
|---|---|---|---|
| 2016/0001781 A1* | 1/2016 | Fung | B60K 28/02 |
| | | | 701/36 |
| 2016/0202700 A1* | 7/2016 | Sprigg | G05D 1/0061 |
| | | | 701/23 |
| 2016/0207536 A1* | 7/2016 | Yamaoka | B60W 50/10 |
| 2016/0207537 A1 | 7/2016 | Urano et al. | |
| 2016/0207538 A1 | 7/2016 | Urano et al. | |
| 2016/0209841 A1* | 7/2016 | Yamaoka | B60W 30/00 |
| 2016/0325757 A1* | 11/2016 | Westlund | G05D 1/0061 |
| 2016/0334788 A1* | 11/2016 | Park | B60W 30/12 |
| 2016/0362116 A1* | 12/2016 | Otsuka | G05D 1/0061 |
| 2017/0227959 A1* | 8/2017 | Lauffer | G05D 1/0061 |
| 2017/0248954 A1* | 8/2017 | Tomatsu | B60W 40/08 |
| 2017/0261981 A1* | 9/2017 | Ichikawa | B60W 50/14 |
| 2017/0305425 A1 | 10/2017 | Xing | |
| 2018/0065635 A1 | 3/2018 | Urano et al. | |
| 2018/0150074 A1* | 5/2018 | Hashimoto | B60K 28/02 |
| 2019/0300044 A1* | 10/2019 | Tsubaki | B62D 6/007 |
| 2020/0070848 A1* | 3/2020 | Ozer | B60W 40/02 |

FOREIGN PATENT DOCUMENTS

| | | | |
|---|---|---|---|
| CN | 105711591 | | 6/2016 |
| CN | 105807763 | | 7/2016 |
| CN | 105807764 | | 7/2016 |
| CN | 106873596 | | 6/2017 |
| CN | 106891895 | | 6/2017 |
| CN | 107031396 A | * | 8/2017 |
| CN | 108297877 | | 7/2018 |
| JP | 2015118438 | | 6/2015 |
| JP | 2016199163 | | 12/2016 |
| JP | 2017065675 | | 4/2017 |
| KR | 20180116663 A | * | 10/2018 |
| WO | 2017018133 | | 2/2017 |

OTHER PUBLICATIONS

Written Opinion dated Dec. 27, 2018 in PCT/CN2018/106707 filed Sep. 20, 2018. (With English Translation).

International Search Report dated Dec. 27, 2018 in PCT/CN2018/106707 filed Sep. 20, 2018. (With English Translation).

* cited by examiner

VEHICLE CONTROL METHOD, APPARATUS AND SYSTEM, AND STORAGE MEDIUM

RELATED APPLICATION

This application is a continuation of International Application No. PCT/CN2018/106707, filed on Sep. 20, 2018, which claims priority to Chinese Patent Application No. 201710936580.9, filed on Oct. 10, 2017 and entitled "VEHICLE CONTROL METHOD, SYSTEM, AND APPARATUS". The entire disclosures of the prior applications are hereby incorporated by reference in their entirety.

FIELD OF THE TECHNOLOGY

This application relates to the field of self-driving car technologies.

BACKGROUND OF THE DISCLOSURE

A self-driving car senses an environment around the car through a vehicle-mounted sensing system, and controls steering and a speed of the car according to road information, location information of other vehicles, obstacle information, and the like that are obtained through sensing, so that the car can run on the road safely and reliably.

In the related technology, when a vehicle in an autopilot (e.g., autonomous control/driving) mode has an emergency, for example, when another vehicle in front stops suddenly and a crash is about to happen, a driver may control the vehicle to exit the autopilot mode through a manual switching operation behavior, and switch to a manual driving mode. For example, the manual switching operation behavior may be pressing a brake pedal or pressing an accelerator pedal. The vehicle may detect, through a pressure sensor disposed on the brake pedal or the accelerator pedal, a pressure of a pressing action performed by a driver on the brake pedal or the accelerator pedal. When the pressure is greater than a threshold, the vehicle is switched from the autopilot mode to the manual driving mode.

In an emergency, the driver may perform a stress control behavior on the vehicle under stress reaction. For example, the driver turns the steering wheel heavily, presses the brake pedal heavily, presses the accelerator pedal heavily, or the like. When the driver performs a stress control behavior on the vehicle, the vehicle mistakenly determines information generated from the stress control behavior of the driver as information of the manual switching operation behavior, and thus is switched from an autopilot mode state to a manual driving mode, so that the driver drives the vehicle manually. The control behavior of the driver is an improper control behavior under stress reaction, and the improper control behavior is likely to cause a traffic safety accident. Therefore, the switching method in the related technology is not intelligent and has low safety performance.

SUMMARY

Embodiments of this application provide a vehicle control method, apparatus and system, and a non-transitory computer-readable storage medium, so as to resolve problems in the related technology. The technical solutions are as follows:

According to an aspect, a vehicle control method is provided. In the method, first control behavior information is obtained, by processing circuitry of a vehicle, via a vehicle-mounted sensor system in a case that the vehicle is in an autonomous control mode. The first control behavior information is generated from a first user action performed on the vehicle. Whether the first control behavior information corresponds to a predetermined type of control behavior information is determined by the processing circuitry. The predetermined type of control behavior information corresponds to a user action type that is triggered by a reflex of a user. A switch, by the processing circuitry, is performed from the autonomous control mode to a manual control mode in a case that the first control behavior information is not determined as the predetermined type of control behavior information.

According to an aspect, the predetermined type of control behavior information includes at least one of stress-induced control behavior information or involuntary control behavior information.

According to an aspect, the first control behavior information includes at least one of a first pressure value for pressing a brake pedal, a second pressure value for pressing an accelerator pedal, or a torsion value of turning a steering wheel. The first control behavior information is determined to be the predetermined type control behavior information in a case that at least one of the first pressure value is greater than a first threshold, the second pressure value is greater than a second threshold, or the torsion value is greater than a third threshold.

According to an aspect, the first control behavior information includes an angle value for turning the steering wheel. The first control behavior information is determined to be the predetermined type of control behavior information in a case that the angle value is greater than a fourth threshold.

According to an aspect, the first control behavior information includes a first time point when the brake pedal is pressed and a second time point when the accelerator pedal is pressed. The first control behavior information is determined to be the predetermined type of control behavior information in a case that a difference between the first time point and the second time point is less than a fifth threshold.

According to an aspect, the first control behavior information includes a second time point when the accelerator pedal is pressed and a third time point when the steering wheel is turned. The first control behavior information is determined to be the predetermined type of control behavior information in a case that a difference between the second time point and the third time point is greater than a sixth threshold.

According to an aspect, the first control behavior information is determined to be the predetermined type of control behavior information in a case that at least one of the first control behavior information includes a first pressure value for pressing the brake pedal and a variation amplitude of the first pressure value in a first time period is greater than a variation amplitude in a second time period and the second time period is after the first time period, or the first control behavior information includes a first distance value for pressing the brake pedal and a variation amplitude of the first distance value in the first time period is greater than a variation amplitude in the second time period.

According to an aspect, the first control behavior information is determined to be the predetermined type of control behavior information in a case that at least one of the first control behavior information includes a second pressure value for pressing the accelerator pedal and a variation amplitude of the second pressure value in a third time period is greater than a variation amplitude in a fourth time period and the fourth time period is after the third time period, or the first control behavior information includes a second distance value for pressing the accelerator pedal and a variation amplitude of the second distance value in the third time period is greater than a variation amplitude in the fourth time period and the fourth time period.

According to an aspect, the first control behavior information is determined to be the predetermined type of control behavior information in a case that at least one of the first control behavior information includes a torsion value for turning the steering wheel and a variation amplitude of the torsion value in a fifth time period is greater than a variation amplitude in a sixth time period and the sixth time period is after the fifth time period, or the first control behavior information includes an angle value for turning the steering wheel and a variation amplitude of the angle value in the fifth time period is greater than a variation amplitude in the sixth time period and the sixth time period is after the fifth time period.

According to an aspect, after the switching, second control behavior information and vehicle running state information are obtained via the vehicle-mounted sensor system in a case that the vehicle is in the manual driving mode. The second control behavior information is generated from a second user action performed on the vehicle. A determination is made as to whether the second control behavior information is dangerous behavior information according to the second control behavior information and the vehicle running state information. An aided control mode is started in a case that the second control behavior information is the dangerous behavior information. The aided control mode is configured to perform aided control to at least one of the brake pedal, the accelerator pedal, and the steering wheel according to the second control behavior information and the vehicle running state information.

According to an aspect, the vehicle running state information includes a speed value of the vehicle. The determination of whether the second control behavior information is the dangerous behavior information includes at least one of determining, according to the second control behavior information and the speed value of the vehicle, whether the speed value of the vehicle in a seventh time period is greater than a seventh threshold, and determining that the second control behavior information is the dangerous behavior information in a case that the speed value of the vehicle in the seventh time period is greater than the seventh threshold, or determining, according to the second control behavior information and the speed value of the vehicle, whether the speed value of the vehicle in the seventh time period is less than an eighth threshold, and determining that the second control behavior information is the dangerous behavior information in a case that the speed value of the vehicle in the seventh time period is less than the eighth threshold.

According to an aspect, the vehicle running state information includes an angular velocity value of the vehicle. The determination of whether the second control behavior information is the dangerous behavior information includes determining, according to the second control behavior information and the angular velocity value of the vehicle, whether the angular velocity value of the vehicle is greater than a ninth threshold in an eighth time period, and determining that the second control behavior information is the dangerous behavior information in a case that the angular velocity value of the vehicle is greater than the ninth threshold in the eighth time period.

According to an aspect, a vehicle control apparatus is provided. The vehicle control apparatus includes processing circuitry configured to perform any of the vehicle control methods.

According to an aspect, a vehicle control system is provided. The vehicle control system includes a vehicle-mounted sensor system and the vehicle control apparatus.

According to an aspect, a non-transitory computer readable storage medium is provided. The non-transitory computer readable storage medium stores instructions which when executed by a processor cause the processor to implement any of the vehicle control methods.

The technical solutions provided in the embodiments of this application achieve at least the following beneficial effects:

It is identified whether first control behavior information corresponds to a predetermined type of control behavior information (e.g., stress-induced or involuntary control behavior information), to prevent the vehicle control apparatus from mistakenly determining stress reaction behavior information, which is generated by a driver under stress reaction, as manual switching operation behavior information and handing over vehicle control to the driver mistakenly. Therefore, it is prevented that the driver gets into danger due to an improper control behavior under stress reaction. It is implemented that a vehicle having an autopilot mode can hand over vehicle control to a driver according to a real control intention of the driver, so that the vehicle is switched from the autopilot mode to a manual driving mode more intelligently, and safety performance of the vehicle is improved.

BRIEF DESCRIPTION OF THE DRAWINGS

To describe the technical solutions in the embodiments of this application more clearly, the following briefly introduces the accompanying drawings required for describing the embodiments. The accompanying drawings in the following description merely show some embodiments of the present disclosure, and a person of ordinary skill in the art may still derive other drawings from these accompanying drawings.

DESCRIPTION OF EMBODIMENTS

To make the objectives, technical solutions and advantages of the present disclosure clearer, the following describes implementations of the present disclosure in further detail with reference to the accompanying drawings.

In a vehicle control method in the related technology, stress control behavior information of a driver is mistakenly determined as manual switching operation behavior information, and thus a vehicle is switched from an autopilot mode state to a manual driving mode, which puts the driver in danger. In view of this problem, a vehicle control method provided in the embodiments of the present disclosure provides the following technical solution: acquiring first control behavior information through a vehicle-mounted sensing system in a case that a vehicle is in an autopilot mode; identifying whether the first control behavior information belongs to stress control behavior information; switching from the autopilot mode to a manual driving mode in a case that the first control behavior information does not belong to the stress control behavior information. In the embodiments of the present disclosure, it is identified whether first control behavior information belongs to stress control behavior information, to prevent the vehicle control apparatus from mistakenly determining stress reaction behavior information, which is generated by a driver under stress reaction, as manual switching operation behavior information and handing over vehicle control to the driver mistakenly. Therefore, it is prevented that the driver gets into danger due to an improper control behavior under stress reaction. It is implemented that a vehicle having an autopilot mode can hand over vehicle control to a driver according to a real control intention of the driver, so that the vehicle is switched from the autopilot mode to a manual driving mode more intelligently, and safety performance of the vehicle is improved.

Figure 1:
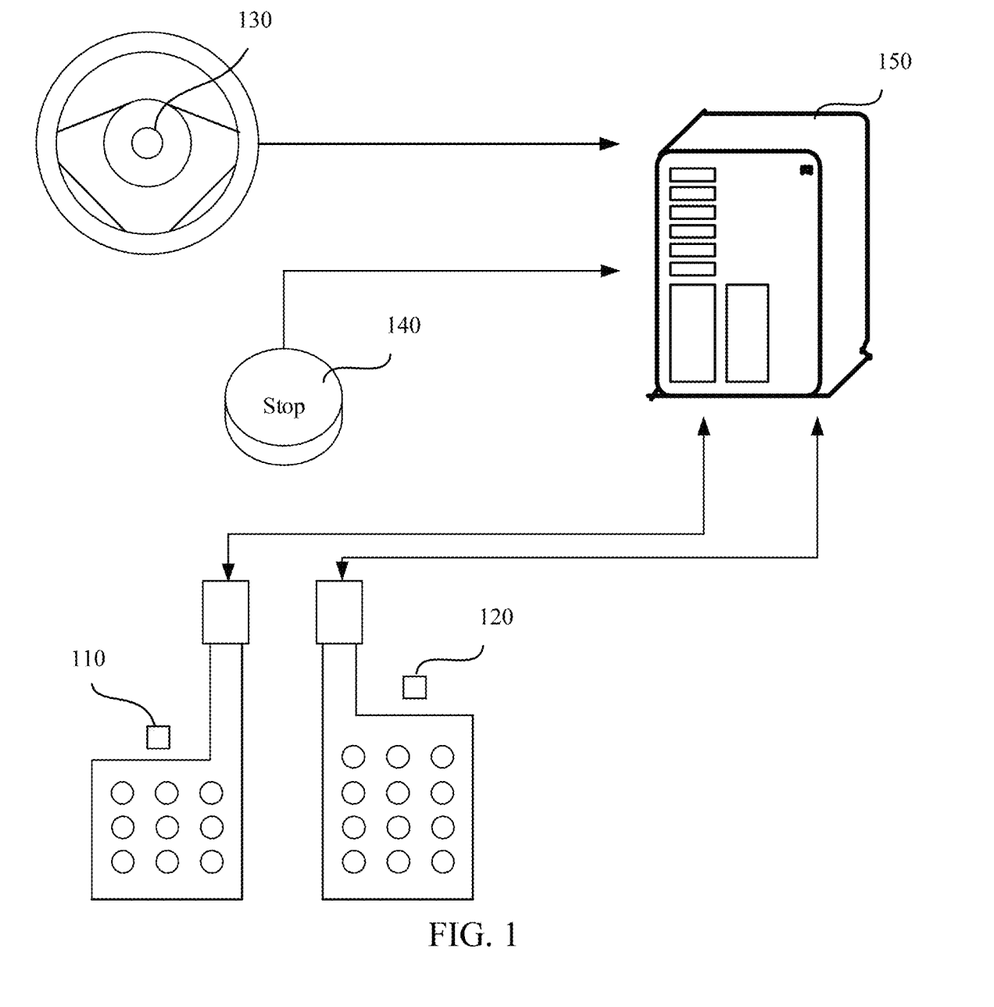
FIG. 1 is a schematic structural diagram of a vehicle control system according to an embodiment of the present disclosure.

Referring to FIG. 1, which is a schematic structural diagram of a vehicle control system according to an embodiment of the present disclosure. As shown in the figure, the vehicle control system provided in this embodiment of the present disclosure includes a vehicle-mounted sensing system, an emergency button 140, and a vehicle control device 150. The vehicle control device 150 establishes a communication connection to the vehicle-mounted sensing system and the emergency button 140 through a wired or wireless manner. The vehicle-mounted sensing system obtains control behavior information through a first sensor component 110 located near a brake pedal, a second sensor component 120 located near an accelerator pedal, and a third sensor component 130 located near a steering wheel, obtains vehicle running state information through a sensor component located at another location in the vehicle, and transmits the control behavior information and the vehicle running state information to the vehicle control device 150. The emergency button 140 has the highest authority (or priority), and when the emergency button 140 is pressed, the vehicle is directly switched from an autopilot mode to a manual driving mode.

The control behavior information is information generated from a control behavior (or action) performed by a driver on the vehicle. The control behavior information includes first control behavior information and second control behavior information. The first control behavior information is information generated from a control behavior performed by the driver on the vehicle when the vehicle is in the autopilot mode. The second control behavior information is information generated from a control behavior performed by the driver on the vehicle when the vehicle is in the manual driving mode. For example, the control behavior performed by the driver on the vehicle may be at least one of pressing the brake pedal, pressing the accelerator pedal, and turning the steering wheel.

The stress control behavior information (or stress-induced control behavior information) is information corresponding to a control behavior triggered by a stress reaction (e.g., reflex or involuntary/unintentional action) of the driver in an emergency. Optionally, the stress control behavior information is information generated from a control behavior performed by the driver on at least one of the brake pedal, the accelerator pedal, and the steering wheel under stress reaction, for example, information generated from at least one of the following behaviors of the driver in an emergency: pressing the brake pedal, pressing the accelerator pedal, and turning the steering wheel. Optionally, the stress control behavior information is image information, which is acquired by a camera in the vehicle control system, a stress reaction of the driver in an emergency. For example, the camera acquires a facial expression and/or a movement range of a stress reaction of the driver in an emergency.

The vehicle-mounted sensing system may acquire the control behavior information in the following manners.

The first sensor component 110 includes a first pressure sensor and/or a first displacement sensor. A first pressure value applied on the brake pedal when the driver presses the brake pedal is measured by using the first pressure sensor, and/or a first distance value by which the brake pedal is moved when the driver presses the brake pedal is measured by using the first displacement sensor.

The second sensor component 120 includes a second pressure sensor and/or a second displacement sensor. A second pressure value applied on the accelerator pedal when the driver presses the accelerator pedal is measured by using the second pressure sensor, and/or a second distance value by which the accelerator pedal is moved when the driver presses the accelerator pedal is measured by using the second displacement sensor.

The third sensor component 130 includes a torsion sensor and/or an angle sensor. A torsion value of the steering wheel when the driver turns the steering wheel is measured by using the torsion sensor, and/or an angle value of rotation of the steering wheel when the driver turns the steering wheel is measured by using the angle sensor.

Optionally, the vehicle control system further includes a camera in the vehicle. The camera may acquire image information of a driving action of the driver (the driving action includes a facial expression of the driver and/or a movement range of the driving action of the driver), to obtain first control information, and transmit the first control information to the vehicle control device. The vehicle control device processes the first control information by invoking a stress reaction prediction model, to determine whether the first control information is stress control behavior information. The stress reaction prediction model is a machine learning model, and is used for representing a rule for determining, based on the image information of the driving action, whether the driving action is a stress control behavior.

The sensor component is disposed, according to a behavior characteristic in a conditioned reflex of a human body, at a location where the driver is most likely to touch in an emergency.

A sensor component configured to detect a vehicle running state is at another location in the vehicle. The sensor component may be a speed sensor and/or an angular velocity sensor. A speed value of the vehicle is measured by using the speed sensor, and/or an angular velocity value of the vehicle is measured by using the angular velocity sensor.

The emergency button 140 is disposed at a location next to a gear lever of the vehicle, and is configured to enable the vehicle to switch from the autopilot mode to the manual driving mode after the driver presses the emergency button 140. For a vehicle having an autopilot mode, an emergency button 140 with the highest priority needs to be disposed, so that a driver can take over the control immediately at any time.

Figure 2:
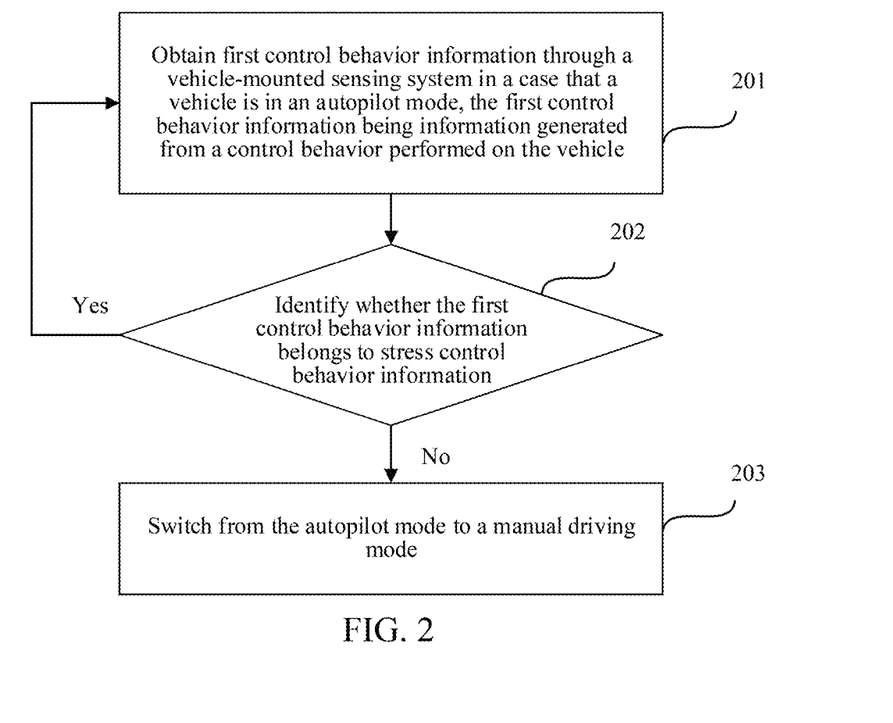
FIG. 2 is a method flowchart of a vehicle control method according to an embodiment of the present disclosure.

Referring to FIG. 2, which is a method flowchart of a vehicle control method according to an embodiment of the present disclosure. In this embodiment, the vehicle control method being applied to the vehicle control device 150 shown in FIG. 1 is taken as an example.

In step 201, a vehicle control device obtains first control behavior information through a vehicle-mounted sensing system in a case that a vehicle is in an autopilot state, the first control behavior information being information generated from a control behavior (or action) performed on the vehicle.

When the vehicle is in an autopilot mode, the vehicle control device acquires first control behavior information through the vehicle-mounted sensing system. The first control behavior information includes at least one of the following information: information generated when a driver presses a brake pedal, information generated when a driver presses an accelerator pedal, and information generated when a driver turns a steering wheel.

In an optional embodiment, a first sensing component of the vehicle-mounted sensing system measures the information generated by pressing the brake pedal, which includes a first pressure value and/or a first distance value, and transmits the first pressure value and/or the first distance value to the vehicle control device. A second sensing component of the vehicle-mounted sensing system measures the information generated by pressing the accelerator pedal, which includes a second pressure value and/or a second distance value, and transmits the second pressure value and/or the second distance value to the vehicle control device. A third sensing component of the vehicle-mounted sensing system measures the information generated by turning the steering wheel, which includes a torsion value and/or an angle value, and transmits the torsion value and/or the angle value to the vehicle control device.

In step 202, the vehicle control device identifies whether the first control behavior information belongs (or corresponds) to a predetermined type of control behavior information (e.g., stress-induced or involuntary control behavior information). The predetermined type of control behavior information can correspond to a user action type that is triggered by a reflex of a user. For example, stress control behavior information can be information corresponding to a control behavior triggered by a stress reaction (e.g., reflex or involuntary/unintentional action) in an emergency.

Generally, the control behavior triggered by the stress reaction when the driver is in an emergency is not a real (e.g., unintentional) intention of the driver. For example, the driver presses the brake pedal heavily, presses the accelerator pedal heavily, turns the steering wheel heavily, or mistakes the accelerator pedal for the brake pedal under stress reaction and presses the accelerator pedal. Therefore, the vehicle control device needs to identify the first control behavior information of the driver, and determine whether the first control behavior information belongs to stress control behavior information.

The stress control behavior information usually has the following features:

In a first case, the stress control behavior information is information generated from excessive control. In an emergency, under stress reaction, the driver may press the brake pedal heavily, press the accelerator pedal heavily, turn the steering wheel heavily, or turn the steering wheel excessively in a panic.

In a second case, the stress control behavior information is information generated from an incorrect combination of control behaviors. In an emergency, under stress reaction, the driver may control the vehicle randomly in a panic. For example, the driver presses the brake pedal and the accelerator pedal at the same time, and such a control behavior is abnormal.

In a third case, the driver only presses the accelerator pedal but does not turn the steering wheel. Such a control behavior is also abnormal. Usually, the driver presses the accelerator pedal without turning the steering wheel correspondingly only when the driver mistakes the accelerator pedal for the brake pedal under stress reaction.

In an optional embodiment, in the first case described above, the driver applies a great force on at least one of the brake pedal, the accelerator pedal, and the steering wheel in an excessive operation. When the first sensing component detects the first pressure value, the first pressure value is transmitted to the vehicle control device. When the second sensing component detects the second pressure value, the second pressure value is transmitted to the vehicle control device. When the third sensing component detects the torsion value, the torsion value is transmitted to the vehicle control device. When the vehicle control device determines that the first control behavior information meets at least one of the following situations: the first pressure value is greater than a first threshold, the second pressure value is greater than a second threshold, and the torsion value is greater than a third threshold, it is determined that the first control behavior information is stress behavior information. In this embodiment, the first control behavior information includes at least one of the first pressure value, the second pressure value, and the torsion value.

The first threshold is a large pressure value obtained through experiment and calculation simulation. In a case that the pressure value generated when the driver presses the brake pedal exceeds the first threshold, the brake pedal pressing action of the driver is not the real intention of the driver, but excessive control over the brake pedal under stress reaction. The second threshold is a large pressure value obtained through experiment and calculation simulation. In a case that the pressure value generated when the driver presses the accelerator pedal exceeds the second threshold, the accelerator pedal pressing action of the driver is not the real intention of the driver, but excessive control over the brake pedal under stress reaction. The third threshold is a torsion value obtained through experiment and calculation simulation. In a case that the torsion value generated when the driver turns the steering wheel exceeds the third threshold, the steering wheel turning action of the driver is not the real intention of the driver, but excessive control over the steering wheel under stress reaction.

In an optional embodiment, if the driver turns the steering wheel excessively under stress reaction, the steering wheel is rotated by an extremely large angle. The third sensing component detects an angle value generated from rotation of the steering wheel and transmits the angle value to the vehicle control device. When the angle value is greater than a fourth threshold, the vehicle control system determines that the first control behavior information is stress behavior information. In this embodiment, the first control behavior information includes the angle value. The fourth threshold is an angle value obtained through experiment and calculation simulation. In a case that the angle value generated when the driver turns the steering wheel exceeds the fourth threshold, the steering wheel turning action of the driver is not the real intention of the driver, but excessive control over the steering wheel under stress reaction.

Optionally, the first control behavior information includes the first pressure value, the second pressure value, the torsion value, and the angle value. The vehicle control system determines whether the first control behavior information meets at least one of the following three situations: the first pressure value is greater than the first threshold, the second pressure value is greater than the second threshold, and the torsion value is greater than the third threshold. When the first control behavior meets any one of the three situations, it is determined that the first control behavior is the stress behavior information. When the first control behavior does not meet any of the three situations, it is determined whether the angle value is greater than the fourth threshold. If the angle value is not greater than the fourth threshold, it is determined that the first control behavior is not the stress behavior information. If the angle value is greater than the fourth threshold, it is determined that the first control behavior is the stress behavior information.

In an optional embodiment, in the second case described above, when the brake pedal and the accelerator pedal are pressed at the same time, the first sensing component detects the first pressure value and/or the first distance value and transmits the first pressure value and/or the first distance value to the vehicle control device; the second sensing component detects the second pressure value and/or the second distance value and transmits the second pressure value and/or the second distance value to the vehicle control device. The vehicle control device calculates a first time point when the first pressure value and/or the first distance value are/is generated and a second time point when the second pressure value and/or the second distance value are/is generated. If a difference between the first time point and the second time point is less than a fifth threshold, it is determined that the first control behavior information is the stress behavior information. In this embodiment, the first control behavior information includes the first pressure value and/or the first distance value, and the second pressure value and/or the second distance value. The fifth threshold is a time period value obtained through experiment and calculation simulation. When a difference between the first time point at which information is generated as the driver presses the brake pedal and the second time point at which information is generated as the driver presses the accelerator pedal is less than the fifth threshold, the driver performs improper control of pressing the brake pedal and the accelerator pedal at the same time under stress reaction.

Optionally, the first control behavior information includes the first pressure value, the first distance value, the second pressure value, the second distance value, and the torsion value. The vehicle control system determines whether the first control behavior information meets at least one of the following situations: the first pressure value is greater than the first threshold, the second pressure value is greater than the second threshold, and the torsion value is greater than the third threshold. When the first control behavior meets any one of the three situations, it is determined that the first control behavior is the stress behavior information. When the first control behavior does not meet any of the three situations, it is determined whether a difference between the first time point and the second time point is less than a fifth threshold. If the difference between the first time point and the second time point is not less than the fifth threshold, it is determined that the first control behavior is not the stress behavior information. If the difference between the first time point and the second time point is less than the fifth threshold, it is determined that the first control behavior is the stress behavior information.

In an optional embodiment, in the third case described above, the first pressure value and/or the first distance value is generated when only the accelerator pedal is pressed. Because the vehicle-mounted sensing system acquires control behavior information of the driver continuously, long after the driver presses the accelerator pedal, the driver may turn the steering wheel, thus generating a torsion value and/or an angle value. The vehicle-mounted sensing system transmits the first pressure value and/or the first distance value, and the torsion value and/or the angle value to the vehicle control device. If a difference between the first time point when the first pressure value and/or the first distance value are/is generated and a third time point when the torsion value and/or the angle value are/is generated is greater than a sixth threshold, it is determined that the first control behavior information is the stress behavior information. The first control behavior information includes the first pressure value and/or the first distance value, and the torsion value and/or the angle value. The sixth threshold is a large time period value obtained through experiment and calculation simulation. When a difference between the first time point at which information is generated as the driver presses the accelerator pedal and the third time point at which information is generated as the driver turns the steering wheel is greater than the sixth threshold, the driver performs incorrect control of pressing the accelerator pedal alone under stress reaction.

Optionally, the first control behavior information includes the first pressure value, the first distance value, the second pressure value, and the torsion value. The vehicle control system determines whether the first control behavior information meets at least one of the following three situations: the first pressure value is greater than the first threshold, the second pressure value is greater than the second threshold, and the torsion value is greater than the third threshold. When the first control behavior meets any one of the three situations, it is determined that the first control behavior is the stress behavior information. When the first control behavior does not meet any of the three situations, it is determined whether the difference between the first time point and the third time point is greater than the sixth threshold. If the difference between the first time point and the third time point is not greater than the sixth threshold, it is determined that the first control behavior is not the stress behavior information. If the difference between the first time point and the third time point is greater than the sixth threshold, it is determined that the first control behavior is the stress behavior information.

In step 203, the vehicle control device switches the vehicle from the autopilot mode (e.g., an autonomous driving/control mode) to a manual driving mode in a case that the first control behavior information does not belong (or correspond) to the stress control behavior information.

When the vehicle control device determines that the first control behavior information does not belong to the stress control behavior information, the vehicle is switched from the autopilot mode to the manual driving mode, to hand over the control to the driver.

In conclusion, in this embodiment of the present disclosure, it is identified whether first control behavior information belongs to stress control behavior information, to prevent the vehicle control apparatus from mistakenly determining stress reaction behavior information, which is generated by a driver under stress reaction, as manual switching operation behavior information and handing over vehicle control to the driver mistakenly. Therefore, it is prevented that the driver gets into danger due to an improper control behavior under stress reaction. It is implemented that a vehicle having an autopilot mode can hand over vehicle control to a driver according to a real (e.g., intentional) control intention of the driver, so that the vehicle is switched from the autopilot mode to a manual driving mode more intelligently, and safety performance of the vehicle is improved.

Figure 3:
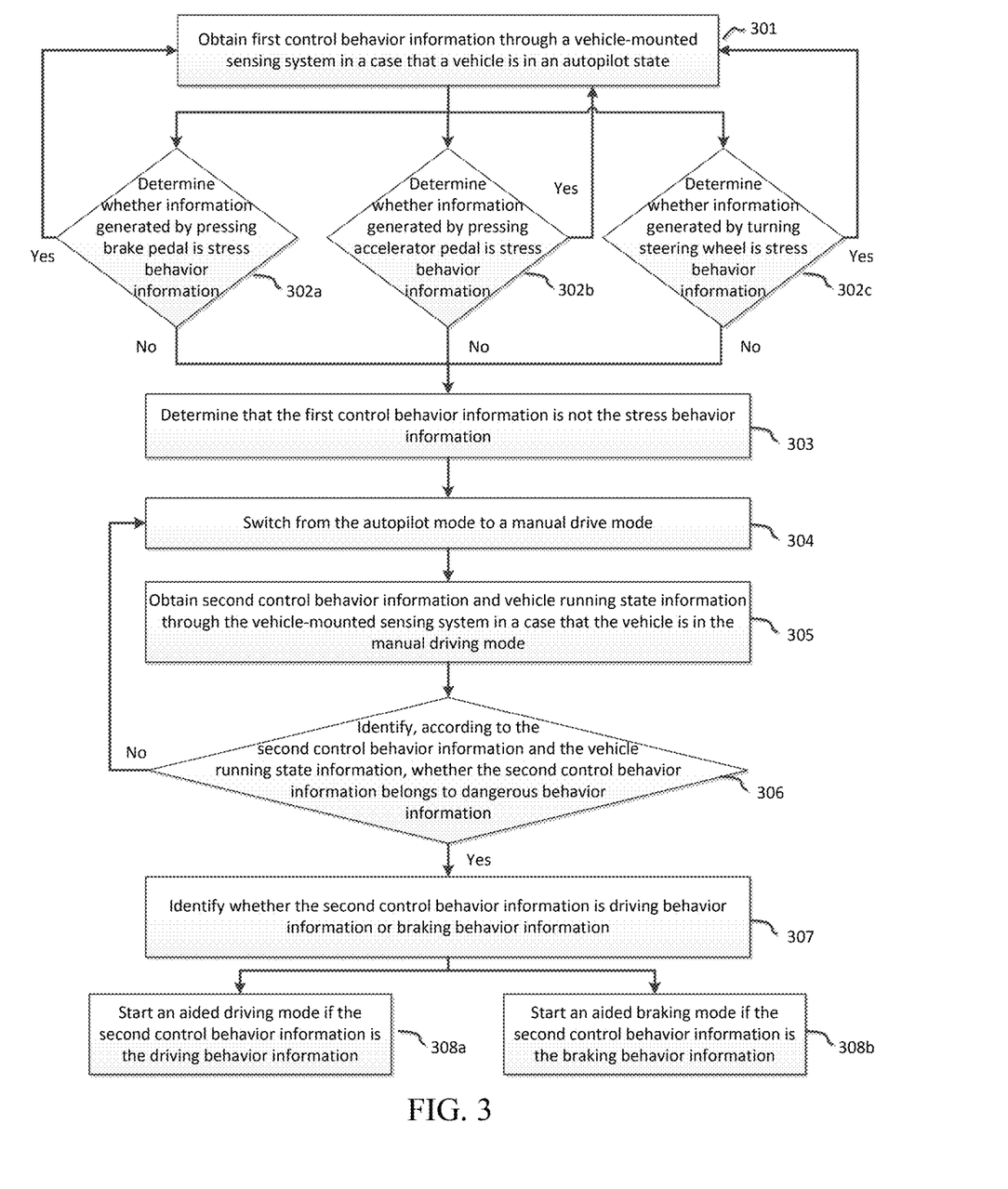
FIG. 3 is a method flowchart of a vehicle control method according to another embodiment of the present disclosure.

Referring to FIG. 3, which is a method flowchart of a vehicle control method according to another embodiment of this application. In this embodiment, the vehicle control method being applied to the vehicle control device 150 in FIG. 1 is taken as an example.

In step 301, a vehicle control device obtains first control behavior information through a vehicle-mounted sensing system in a case that a vehicle is in an autopilot state, the first control behavior information being information generated from a control behavior (or action) performed on the vehicle.

When the vehicle is in an autopilot mode, the vehicle control device acquires first control behavior information through the vehicle-mounted sensing system. The first control behavior information includes at least one of the following information: information generated when a driver presses a brake pedal, information generated when a driver presses an accelerator pedal, and information generated when a driver turns a steering wheel.

In an optional embodiment, a first sensing component measures the information generated by pressing the brake pedal, which includes a first pressure value and/or a first distance value, and transmits the first pressure value and/or the first distance value to the vehicle control device. A second sensing component measures the information generated by pressing the accelerator pedal, which includes a second pressure value and/or a second distance value, and transmits the second pressure value and/or the second distance value to the vehicle control device. A third sensing component measures the information generated by turning the steering wheel, which includes a torsion value and/or an angle value, and transmits the torsion value and/or the angle value to the vehicle control device.

After the vehicle control device obtains the first control behavior information, if the first control behavior information includes information generated by pressing the brake pedal, step 302a is performed. If the first control behavior information includes information generated by pressing the accelerator pedal, step 302b is performed. If the first control behavior information includes information generated by turning the steering wheel, step 302c is performed. If the first control behavior information includes information generated by pressing the brake pedal and information generated by pressing the accelerator pedal, step 302a may be performed first, and then step 302b is performed; or step 302b is performed first, and then step 302a is performed. If the first control behavior information includes information generated by pressing the brake pedal and information generated by turning the steering wheel, step 302a may be performed first, and then step 302c is performed; or step 302c is performed first, and then step 302a is performed. If the first control behavior information includes information generated by pressing the accelerator pedal and information generated by turning the steering wheel, step 302b is performed first, and then step 302c is performed; or step 302c is performed first, and then step 302b is performed. If the first control behavior includes information generated by pressing the brake pedal, information generated by pressing the accelerator pedal, and information generated by turning the steering wheel, step 302a, step 302b, and step 302c are performed. A sequence of performing step 302a, step 302b, and step 302c is not limited.

A first control behavior of the driver under stress reaction is different from a normal control behavior (for example, a manual switching operation behavior). Therefore, first control behavior information that is generated under stress reaction and obtained by the vehicle-mounted sensing system is also different from first control behavior information generated from a normal control behavior. In the action of pressing the brake pedal, the driver presses the brake pedal suddenly under stress reaction. Therefore, a pressure applied by the driver on the brake pedal and a movement distance of the pressed brake pedal both increase abruptly and then increase slowly. In the action of pressing the accelerator pedal, the driver presses the accelerator pedal suddenly under stress reaction. Therefore, a pressure applied by the driver on the accelerator pedal and a movement distance of the pressed accelerator pedal both increase abruptly and then increase slowly. For the action of turning the steering wheel, the driver turns the steering wheel suddenly under stress reaction. Therefore, the torsion applied by the driver on the steering wheel and a rotation angle of the turned steering wheel both increase abruptly and then increase slowly. In the following, variations over time of the first control information generated under stress reaction are illustrated with an example in which the driver presses the brake pedal under stress reaction.

Figure 4:
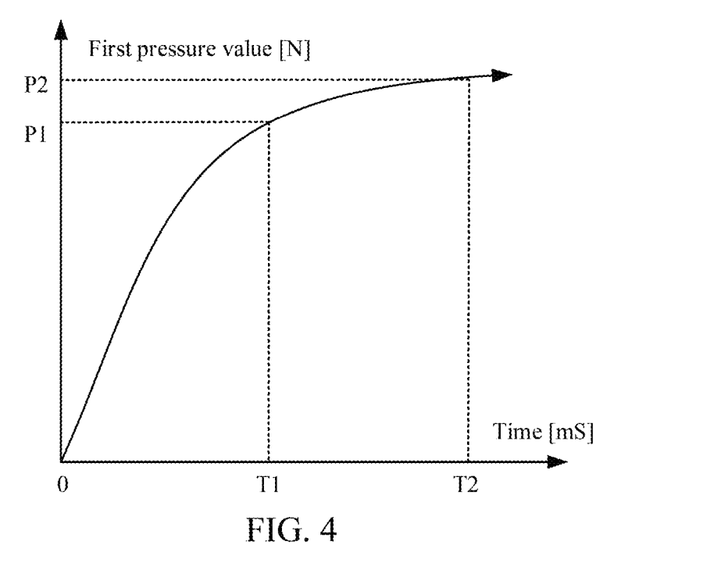
FIG. 4 is a curve diagram of variations over time of a pressure value generated from pressing a brake pedal under stress reaction.

Referring to FIG. 4, which shows a relationship of the first pressure value vs. time, where the first pressure value is generated when the driver presses the brake pedal under stress reaction. As shown in the figure, the control behavior triggered by the stress reaction of the driver in an emergency is different from a normal control behavior. In the control behavior triggered by the stress reaction, the pressure of pressing the brake pedal increases abruptly and then increases slowly. In the normal control behavior, the pressure with which the driver presses the brake pedal increases gradually.

Therefore, in an optional embodiment, the determining of whether the information generated when the driver presses the brake pedal is the stress control behavior information may be implemented by determining whether a variation amplitude of the first pressure value in a first time period is greater than a variation amplitude in a second time period, where the second time period is after the first time period. For example, as shown in FIG. 4, the first time period ΔT1 is a time period from 0 to T1, and the second time period ΔT2 is a time period from T1 to T2, where ΔT1 and ΔT2 have the same value. The variation amplitude of the first pressure value in ΔT1 is P1, and the variation amplitude of the first pressure value in ΔT2 is (P2-P1). Because P1>(P2-P1), it can be determined that the first pressure value is the stress control behavior information.

Similarly, in an optional embodiment, the determining of whether the information generated when the driver presses the brake pedal is the stress control behavior information may also be implemented by determining whether a variation amplitude of the first distance value in a first time period is greater than a variation amplitude in a second time period, where the second time period is after the first time period.

Similarly, in an optional embodiment, the determining of whether the information generated when the driver presses the accelerator pedal is the stress control behavior information may be implemented by determining whether a variation amplitude of the second pressure value in a third time period is greater than a variation amplitude in a fourth time period, where the fourth time period is after the third time period.

Similarly, in an optional embodiment, the determining of whether the information generated when the driver presses the accelerator pedal is the stress control behavior information may also be implemented by determining whether a variation amplitude of the second distance value in a third time period is greater than a variation amplitude in a fourth time period, where the fourth time period is after the third time period.

Similarly, in an optional embodiment, the determining of whether the information generated when the driver turns the steering wheel is the stress control behavior information may be implemented by determining whether a variation amplitude of the torsion value in a fifth time period is greater than a variation amplitude in a sixth time period, where the sixth time period is after the fifth time period.

Similarly, in an optional embodiment, the determining of whether the information generated when the driver turns the steering wheel is the stress control behavior information may also be implemented by determining whether a variation amplitude of the angle value in a fifth time period is greater than a variation amplitude in a sixth time period, where the sixth time period is after the fifth time period.

In step 302a, the vehicle control device determines whether information generated by pressing a brake pedal is a predetermined type of behavior information (e.g., stress behavior information).

The vehicle control device needs to identify the information generated when the driver presses the brake pedal, and determine whether the information generated by pressing the brake pedal belongs to the stress control behavior information.

In an optional embodiment, the information generated by pressing the brake pedal includes a first pressure value. The vehicle control system determines whether a variation amplitude of the first pressure value in a first time period is greater than a variation amplitude in a second time period, where the second time period is after the first time period, and if yes, it is determined that the first pressure value is the stress behavior information; otherwise, it is determined that the first pressure value is not the stress behavior information.

In an optional embodiment, the information generated by pressing the brake pedal includes a first distance value. The vehicle control system determines whether a variation amplitude of the first distance value in a first time period is greater than a variation amplitude in a second time period, where the second time period is after the first time period, and if yes, it is determined that the first distance value is the stress behavior information; otherwise, it is determined that the first distance value is not the stress behavior information.

In an optional embodiment, the information generated by pressing the brake pedal includes a first pressure value and a first distance value. If either of the first pressure value and the first distance value is stress behavior information, or both the first pressure value and the first distance value are stress behavior information, it is determined that the information generated by pressing the brake pedal is the stress behavior information. If neither the first pressure value nor the first distance value is stress behavior information, it is determined that the information generated by pressing the brake pedal is not the stress behavior information.

In an optional embodiment, the vehicle control system determines whether the first pressure value is greater than a first threshold. When the first pressure value is greater than the first threshold, it is determined that the information generated by pressing the brake pedal is the stress behavior information. When the first pressure value is not greater than the first threshold, it is determined, in any one of the three determining manners above, whether the information generated by pressing the brake pedal is the stress behavior information.

In step 302b, the vehicle control device determines whether information generated by pressing an accelerator pedal is a predetermined type of behavior information (e.g., stress behavior information).

The vehicle control device needs to identify the information generated when the driver presses the accelerator pedal, and determine whether the information generated by pressing the accelerator pedal belongs to the stress control behavior information.

In an optional embodiment, the information generated by pressing the accelerator pedal includes a second pressure value. The vehicle control system determines whether a variation amplitude of the second pressure value in a third time period is greater than variation amplitude in a fourth time period, where the fourth time period is after the third time period, and if yes, it is determined that the second pressure value is the stress behavior information; otherwise, it is determined that the second pressure value is not the stress behavior information.

In an optional embodiment, the information generated by pressing the accelerator pedal includes a second distance value. The vehicle control system determines whether a variation amplitude of the second distance value in a third time period is greater than variation amplitude in a fourth time period, where the fourth time period is after the third time period, and if yes, it is determined that the second distance value is the stress behavior information; otherwise, it is determined that the second distance value is not the stress behavior information.

In an optional embodiment, the information generated by pressing the accelerator pedal includes a second pressure value and a second distance value. If either of the second pressure value and the second distance value is stress behavior information, or both the second pressure value and the second distance value are stress behavior information, it is determined that the information generated by pressing the accelerator pedal is the stress behavior information. If neither the second pressure value nor the second distance value is stress behavior information, it is determined that the information generated by pressing the accelerator pedal is not the stress behavior information.

In an optional embodiment, the vehicle control system determines whether the second pressure value is greater than a second threshold. When the second pressure value is greater than the second threshold, it is determined that the information generated by pressing the accelerator pedal is the stress behavior information. When the second pressure value is not greater than the second threshold, it is determined, in any one of the three determining manners above, whether the information generated by pressing the accelerator pedal is the stress behavior information.

In step 302c, the vehicle control device determines whether information generated by turning a steering wheel is a predetermined type of behavior information (e.g., stress behavior information).

The vehicle control device needs to identify the information generated when the driver turns the steering wheel, and determine whether the information generated by turning the steering wheel belongs to the stress control behavior information.

In an optional embodiment, the information generated by turning the steering wheel includes a torsion value. The vehicle control system determines whether a variation amplitude of the torsion value in a fifth time period is greater than a variation amplitude in a sixth time period, where the sixth time period is after the fifth time period, and if yes, it is determined that the torsion value is the stress behavior information; otherwise, it is determined that the torsion value is not the stress behavior information.

In an optional embodiment, the information generated by turning the steering wheel includes an angle value. The vehicle control system determines whether a variation amplitude of the angle value in a fifth time period is greater than a variation amplitude in a sixth time period, where the sixth time period is after the fifth time period, and if yes, it is determined that the angle value is the stress behavior information; otherwise, it is determined that the angle value is not the stress behavior information.

In an optional embodiment, the information generated by pressing the accelerator pedal includes a torsion value and an angle value. If either of the torsion value and the angle value is stress behavior information, or both the torsion value and the angle value are stress behavior information, it is determined that the information generated by turning the steering wheel is the stress behavior information. If neither the torsion value nor the angle value is stress behavior information, it is determined that the information generated by turning the steering wheel is not the stress behavior information.

In an optional embodiment, the vehicle control system determines whether the torsion value is greater than a third threshold. When the torsion value is greater than the third threshold, it is determined that the information generated by turning the steering wheel is the stress behavior information. When the torsion value is not greater than the third threshold, it is determined, in any one of the three determining manners above, whether the information generated by turning the steering wheel is the stress behavior information.

In step 303, the vehicle control device determines that the first control behavior information is not the predetermined type of behavior information (e.g., stress behavior information).

If at least one of the information generated by pressing the brake pedal, the information generated by pressing the accelerator pedal, and the information generated by turning the steering wheel is the stress behavior information, it is determined that the first control behavior information is the stress behavior information.

If none of the information generated by pressing the brake pedal, the information generated by pressing the accelerator pedal, and the information generated by turning the steering wheel is the stress behavior information, it is determined that the first control behavior information is not the stress behavior information.

In step 304, the vehicle control device switches the vehicle from the autopilot mode (e.g., autonomous driving/control mode) to a manual driving mode.

When the vehicle control device determines that the first control behavior information is not stress control behavior information, the vehicle is switched from the autopilot mode to the manual driving mode.

In the foregoing process, it is implemented that vehicle control is handed over to the driver according to a real (e.g., intentional) control intention of the driver, so that the vehicle is switched from the autopilot mode to the manual driving mode intelligently. In an optional embodiment, for control operations after the vehicle is switched to the manual driving mode, this embodiment of this application further provides the following steps.

In step 305, the vehicle control device obtains second control behavior information and vehicle running information through the vehicle-mounted sensing system in a case that the vehicle is in the manual driving mode, the second control behavior information being information generated from a control behavior performed on the vehicle.

The vehicle running state information includes a speed value and/or an angular velocity value of the vehicle. The vehicle-mounted sensing system obtains the speed value and/or the angular velocity value of the vehicle, and transmits the speed value and/or the angular velocity value of the vehicle to the vehicle control device. The vehicle-mounted sensing system acquires the second control behavior information. The second control behavior information includes at least one of information generated when the driver presses the brake pedal, information generated when the driver presses the accelerator pedal, and information generated when the driver turns the steering wheel in the manual driving mode.

In an optional embodiment, the first sensor component measures the information generated by pressing the brake pedal, which includes a first pressure value and/or a first distance value, and transmits the first pressure value and/or the first distance value to the vehicle control device. The second sensing component measures the information generated by pressing the accelerator pedal, which includes a second pressure value and/or a second distance value, and transmits the second pressure value and/or the second distance value to the vehicle control device. The third sensing component measures the information generated by turning the steering wheel, which includes a torsion value and/or an angle value, and transmits the torsion value and/or the angle value to the vehicle control device.

In step 306, the vehicle control device identifies, according to the second control behavior information and the vehicle running state information, whether the second control behavior information belongs to dangerous behavior information.

Generally, the vehicle running state information includes a speed value of the vehicle and/or an angular velocity value of the vehicle. Whether the vehicle is accelerated or decelerated excessively is identified according to the speed value of the vehicle. Whether the vehicle is steered excessively is determined according to the angular velocity value of the vehicle. The vehicle control device identifies, according to the second control behavior information and the vehicle running state information, whether the second control behavior information causes the vehicle to be accelerated or decelerated excessively or is steered excessively; if yes, it is determined that the second control behavior information is dangerous behavior information, and step 307 is performed; otherwise, it is determined that the second control behavior information is not dangerous behavior information, and step 304 is performed.

In an optional embodiment, the vehicle control device determines whether the second control behavior information causes the vehicle to be accelerated excessively. The vehicle control device obtains the second control behavior information and the speed value of the vehicle, and determines whether the speed value of the vehicle is greater than a seventh threshold in a seventh time period under the effect of the second control behavior information; if yes, it is determined that the second control behavior information is dangerous behavior information, and step 307 is performed.

The seventh threshold is a large speed value obtained through experiment and calculation simulation. When the speed value of the vehicle is greater than the seventh threshold in the seventh time period under the effect of the second control behavior information, the vehicle gets into danger due to excessive acceleration.

In an optional embodiment, the vehicle control device determines whether the second control behavior information causes the vehicle to be decelerated excessively. The vehicle control device obtains the second control behavior information and the speed value of the vehicle, and determines whether the speed value of the vehicle is less than an eighth threshold in a seventh time period under the effect of the second control behavior information; if yes, it is determined that the second control behavior information is dangerous behavior information, and step 307 is performed.

The eighth threshold is a small speed value obtained through experiment and calculation simulation. When the speed value of the vehicle is less than the eighth threshold in the seventh time period under the effect of the second control behavior information, the vehicle gets into danger due to excessive deceleration.

In an optional embodiment, the vehicle control device determines whether the second control behavior information causes the vehicle to be steered excessively. The vehicle control device obtains the second control behavior information and the angular velocity value of the vehicle and determines whether the angular velocity value of the vehicle is greater than a ninth threshold in an eighth time period under the effect of the second control behavior information; if yes, it is determined that the second control behavior information is dangerous behavior information, and step 307 is performed.

The ninth threshold is a large angular velocity value obtained through experiment and calculation simulation. When the angular velocity value of the vehicle is greater than the ninth threshold in the eighth time period under the effect of the second control behavior information, the vehicle gets into danger due to excessive steering.

In step 307, the vehicle control device identifies whether the second control behavior information is driving behavior information or braking behavior information.

The vehicle control device determines, according to the second control behavior information, whether the control behavior information is driving behavior information or braking behavior information. The driving behavior information is information generated from a driving behavior performed by the driver on the vehicle, and the braking behavior information is information generated from a braking behavior performed by the driver on the vehicle.

In an optional embodiment, the second control behavior information received by the vehicle control device includes the information generated by turning the steering wheel, for example, the torsion value and/or the angle value. Alternatively, the second control behavior information received by the vehicle control device includes the information generated by turning the steering wheel and the information generated by pressing the accelerator pedal, for example, the torsion value and the second pressure value, the torsion value and the second distance value, the angle value and the second pressure value, the angle value and the second distance value, or the like. In this case, it is determined that the second control behavior information is driving behavior information, and step 308a is performed.

In an optional embodiment, the second control behavior information received by the vehicle control device includes the information generated by pressing the brake pedal, for example, the first pressure value and/or the first distance value. Alternatively, the second control behavior information received by the vehicle control device includes the information generated by turning the steering wheel and the information generated by pressing the brake pedal, for example, the torsion value and the first pressure value, the torsion value and the first distance value, the angle value and the first pressure value, the angle value and the first distance value, or the like. In this case, it is determined that the second control behavior information is braking behavior information, and step 308b is performed.

In step 308a, an aided driving mode is started.

The vehicle control device determines that the second control behavior information belongs to the dangerous behavior information, and the aided control mode is started.

In an optional embodiment, there are two aided control modes, one is an aided driving mode that assists the driver in driving the vehicle, and the other is an aided braking mode that assists the driver in braking the vehicle.

In a case that the vehicle control device determines that the second control behavior information belongs to the dangerous behavior information and the second control behavior information is the driving behavior information, the aided driving mode is started.

In an optional embodiment, the vehicle control device starts the aided driving mode, to assist in control over at least one of the brake pedal, the accelerator pedal, and the steering wheel of the vehicle. For example, when the driver turns the steering wheel excessively, the torsion value and/or the angle value received by the vehicle control device are/is large, Electrical Power Steering (EPS) is turned off, to make it difficult for the driver to turn the steering wheel and correct an incorrect driving behavior of turning the steering wheel excessively by the driver. For example, when the driver presses the accelerator heavily and the second pressure value and/or the second distance value are/is large, the vehicle control device reduces the second pressure value and/or the second distance value generated when the driver presses the accelerator pedal, so that the vehicle receives smaller-value information generated by pressing the accelerator pedal, thus correcting an incorrect driving behavior of pressing the accelerator pedal heavily by the driver.

In step 308b, an aided braking mode is started.

In a case that the vehicle control device determines that the second control behavior information belongs to the dangerous behavior information and the second control behavior information is the braking behavior information, the aided braking mode is started.

In an optional embodiment, the vehicle control device starts the aided braking mode, to assist in control over at least one of the brake pedal, the accelerator pedal, and the steering wheel of the vehicle. For example, when the driver presses the brake pedal heavily and the first pressure value and/or the first distance value are/is large, the vehicle control device reduces the first pressure value and/or the first distance value generated when the driver presses the brake pedal, so that the vehicle receives smaller-value information generated by pressing the brake pedal, thus correcting an incorrect driving behavior of pressing the brake pedal heavily by the driver. After the driver presses the brake pedal to enter a manual operation mode, because the driver turns the steering wheel in a panic, the vehicle control device determines the braking behavior information of the driver as dangerous behavior information. In this case, the aided braking mode is started, and electrical power steering is turned off, to make it difficult for the driver to turn the steering wheel, and reduce the risk caused by turning the steering wheel incorrectly by the driver.

In conclusion, in this embodiment of this application, it is identified whether first control behavior information belongs to stress control behavior information, to prevent the vehicle control apparatus from mistakenly determining stress reaction behavior information, which is generated by a driver under stress reaction, as manual switching operation behavior information and handing over vehicle control to the driver mistakenly. Therefore, it is prevented that the driver gets into danger due to an improper control behavior under stress reaction. It is implemented that a vehicle having an autopilot mode can hand over vehicle control to a driver according to a real control intention of the driver, so that the vehicle is switched from the autopilot mode to a manual driving mode more intelligently, and safety performance of the vehicle is improved.

Optionally, in this embodiment of this application, after the vehicle is switched to the manual driving mode, it is identified whether control behavior information belongs to dangerous behavior information, and if yes, an aided control mode is started to assist in control over at least one of the brake pedal, the accelerator pedal, and the steering wheel of the vehicle, thus resolving the problem of danger caused by a dangerous operation of the driver after the vehicle is switched to the manual driving mode. It is implemented that a vehicle having an autopilot mode can still ensure safety of manual driving after vehicle control is handed over to the driver, thus improving safety performance of the vehicle.

Figure 5:
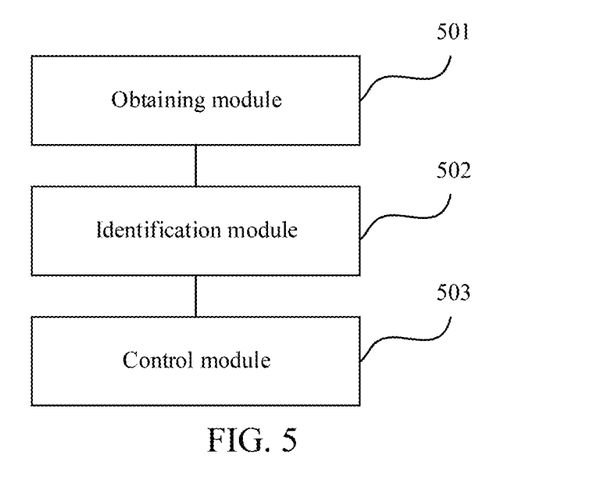
FIG. 5 is an apparatus block diagram of a vehicle control apparatus according to an embodiment of the present disclosure.

Referring to FIG. 5, which is an apparatus block diagram of a vehicle control apparatus according to an embodiment of this application. In this embodiment, the vehicle control apparatus being applied to the vehicle control device 150 shown in FIG. 1 is taken as an example. The apparatus includes: an obtaining module 501, an identification module 502, and a control module 503. The modules can be implemented by circuitry in some embodiments.

The obtaining module 501 is configured to implement the foregoing step 201 and step 301, and in some embodiments step 305, as well as an implicit obtaining-related function in each step.

The identification module 502 is configured to implement the foregoing step 202, step 302a, step 302b, step 302c, step 303, step 306, and step 307 as well as an implicit identification-related function in each step.

The control module 503 is configured to implement the foregoing step 203, step 304, step 308a, and step 308b, and in some embodiments step 305, as well as an implicit control-related function in each step.

In conclusion, in this embodiment of the present disclosure, it is identified whether first control behavior information belongs to stress control behavior information, to prevent the vehicle control apparatus from mistakenly determining stress reaction behavior information, which is generated by a driver under stress reaction, as manual switching operation behavior information and handing over vehicle control to the driver mistakenly. Therefore, it is prevented that the driver gets into danger due to an improper control behavior under stress reaction. It is implemented that a vehicle having an autopilot mode can hand over vehicle control to a driver according to a real control intention of the driver, so that the vehicle is switched from the autopilot mode to a manual driving mode more intelligently, and safety performance of the vehicle is improved.

Optionally, in this embodiment of this application, after the vehicle is switched to the manual driving mode, it is identified whether control behavior information belongs to dangerous behavior information, and if yes, an aided control mode is started to assist in control over at least one of the brake pedal, the accelerator pedal, and the steering wheel of the vehicle, thus resolving the problem of danger caused by a dangerous operation of the driver after the vehicle is switched to the manual driving mode. It is implemented that a vehicle having an autopilot mode can still ensure safety of manual driving after vehicle control is handed over to the driver, thus improving safety performance of the vehicle.

Figure 6:
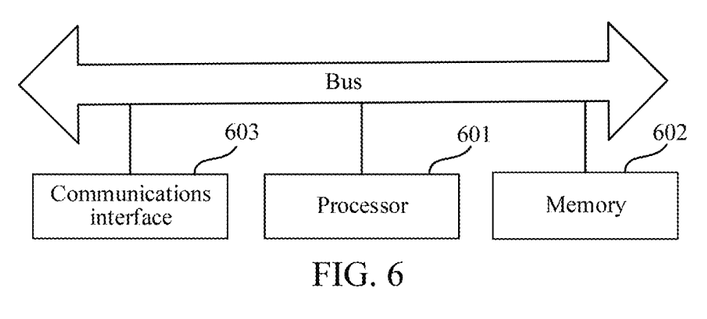
FIG. 6 is a structural block diagram of a vehicle control device according to an embodiment of the present disclosure.

Referring FIG. 6, which is a structural block diagram of a vehicle control device according to an embodiment of this application. The vehicle control device includes: a processor 601, a memory 602, and a communications interface 603.

The communications interface 603 is connected to the processor 601 through a bus or in other manners, and is configured to receive first control behavior information, second control behavior information, and vehicle running state information transmitted by a vehicle-mounted sensing system.

The processor 601 may be processing circuitry such as a central processing unit (CPU), a network processor (NP), or a combination of a CPU and an NP. The processor 603 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) or a combination thereof.

The memory 602 is connected to the processor 601 through a bus or in other manners. The memory 601 stores at least one instruction, at least one program segment, a code set, or an instruction set. The at least one instruction, at least one program segment, code set, or instruction set is loaded and executed by the processor 601 to implement the vehicle control method shown in FIG. 2 or FIG. 3. The memory 602 may be a volatile memory, a non-volatile memory, or a combination thereof. The volatile memory may be a random access memory (RAM), such as a static random access memory (SRAM), or a dynamic random access memory (DRAM). The non-volatile memory may be a read-only memory (ROM), such as a programmable read-only memory (PROM), an erasable programmable read-only memory (EPROM), or an electrically erasable programmable read-only memory (EEPROM). The non-volatile memory may also be a flash memory or a magnetic memory, for example, a magnetic tape, a floppy disk, or a hard disk. The non-volatile memory may also be an optical disc.

An embodiment of this application further provides a computer readable storage medium. The storage medium is, for example, a non-transitory computer readable storage medium. The storage medium stores at least one instruction, at least one program segment, a code set, or an instruction set. The at least one instruction, at least one program segment, code set, or instruction set is loaded and executed by a processor to implement the vehicle control method shown in FIG. 2 or FIG. 3. Optionally, the computer readable storage medium includes a high-speed access memory, and a non-volatile memory.

This application further provides a computer program product including instructions. The computer program product, when run on a computer, causes the computer to perform the vehicle control method according to the various aspects above.

It is to be appreciated that, the term "multiple" mentioned in this text refers to two or more than two. The term "and/or" describes an association relationship between associated objects, and represent that there may be three relationships.

For example, A and/or B may represent three cases: A exists alone, both A and B exist, and B exists alone. The character "/" represents an "or" relationship between associated objects.

The serial numbers of the embodiments of this application are merely used for description, and do not represent preference among the embodiments.

A person of ordinary skill in the art may understand that all or some of steps for implementing the foregoing embodiments may be completed by hardware, or completed by a program instructing relevant hardware. The program may be stored in a non-transitory computer readable storage medium. The aforementioned storage medium may be a read-only memory, a magnetic disk, an optical disc, or the like.

Described above are merely exemplary embodiments of this application, which are not intended to limit this application. Any modification, equivalent replacement, improvement, or the like made without departing from the spirit and principle of this application shall be incorporated in the protection scope of this application.

What is claimed is:

1. A vehicle control method, comprising:
    obtaining, by processing circuitry of a vehicle, first control behavior information via a vehicle-mounted sensor system while the vehicle is in an autonomous control mode, the first control behavior information being generated from sensor data that is detected by the vehicle-mounted sensor system based on a first user action performed on the vehicle, wherein the first control behavior information includes at least one of a brake pressure value when the first user action is pressing a brake pedal, an accelerator pressure value when the first user action is pressing an accelerator pedal, and a torsion value when the first user action is turning a steering wheel;
    determining, by the processing circuitry, that the first control behavior information is a predetermined type of control behavior information when at least one of the brake pressure value is greater than a brake threshold, the accelerator pressure value is greater than an accelerator threshold, and the torsion value is greater than a steering threshold;
    switching, by the processing circuitry, from the autonomous control mode to a manual control mode in response to the first user action only when determining that the first control behavior information is not the predetermined type of control behavior information, and maintaining the autonomous control mode when determining that the first control behavior information is the predetermined type of control behavior information;
    determining whether second control behavior information is dangerous behavior information according to the second control behavior information and vehicle running state information; and
    starting an aided control mode when the second control behavior information is determined to be the dangerous behavior information, wherein
    the vehicle running state information includes an angular velocity value of the vehicle, and
    the determining whether the second control behavior information is the dangerous behavior information includes
        determining, according to the second control behavior information and the angular velocity value of the vehicle, whether the angular velocity value of the vehicle is greater than an angular velocity threshold in a time period, and
        determining that the second control behavior information is the dangerous behavior information when the angular velocity value of the vehicle is greater than the angular velocity threshold in the time period.

2. The method according to claim 1, wherein
    the first control behavior information includes an angle value when the first user action is turning the steering wheel; and
    the determining that the first control behavior information is the predetermined type of control behavior information includes determining that the first control behavior information is the predetermined type of control behavior information when the angle value is greater than an angle threshold.

3. The method according to claim 1, further comprising:
    determining that the first control behavior information is the predetermined type of control behavior information when a difference between a braking time point and an acceleration time point is less than a difference threshold, and
    a timing of the first user action is the braking time point when the brake pedal is pressed and a timing of a second user action is the acceleration time point when the accelerator pedal is pressed.

4. The method according to claim 1, further comprising:
    determining that the first control behavior information is the predetermined type of control behavior information when a difference between an acceleration time point and a steering time point is greater than a difference threshold, and
    a timing of the first user action is the acceleration time point when the accelerator pedal is pressed and a timing of a second user action is the steering time point when the steering wheel is turned.

5. The method according to claim 1, further comprising:
    determining that the first control behavior information is the predetermined type of control behavior information when at least one of:
        the first control behavior information includes the brake pressure value when the first user action is pressing the brake pedal and a variation amplitude of the brake pressure value in a first time period is greater than a variation amplitude of the brake pressure value in a second time period, wherein the second time period is after the first time period; and
        the first control behavior information includes a first distance value when the first action is pressing the brake pedal and a variation amplitude of the first distance value in the first time period is greater than a variation amplitude of the first distance value in the second time period.

6. The method according to claim 1, further comprising:
    determining that the first control behavior information is the predetermined type of control behavior information when at least one of:
        the first control behavior information includes the accelerator pressure value when the first action is pressing the accelerator pedal and a variation amplitude of the accelerator pressure value in a first time period is greater than a variation amplitude of the accelerator pressure value in a second time period, wherein the second time period is after the first time period; and the first control behavior information includes a first distance value when the first action is pressing the accelerator pedal and a variation amplitude of the first distance value in the first time period is greater than a variation amplitude of the first distance value in the second time period.

7. The method according to claim 1, further comprising:
determining that the first control behavior information is the predetermined type of control behavior information when at least one of:
the first control behavior information includes the torsion value when the first user action is turning the steering wheel and a variation amplitude of the torsion value in a first time period is greater than a variation amplitude of the torsion value in a second time period, wherein the second time period is after the first time period; and
the first control behavior information includes an angle value when the first action is turning the steering wheel and a variation amplitude of the angle value in the first time period is greater than a variation amplitude of the angle value in the second time period.

8. The method according to claim 1, after the switching, the method further comprises:
obtaining the second control behavior information and the vehicle running state information via the vehicle-mounted sensor system when the vehicle is in the manual control mode, the second control behavior information being generated from a second user action performed on the vehicle, wherein
the aided control mode is configured to perform aided control to at least one of the brake pedal, the accelerator pedal, and the steering wheel according to the second control behavior information and the vehicle running state information.

9. The method according to claim 8, wherein
the vehicle running state information includes a speed value of the vehicle, and
the determining whether the second control behavior information is the dangerous behavior information includes at least one of
determining, according to the second control behavior information and the speed value of the vehicle, whether the speed value of the vehicle in a time period is greater than a first speed threshold, and determining that the second control behavior information is the dangerous behavior information when the speed value of the vehicle in the time period is greater than the first speed threshold; and
determining, according to the second control behavior information and the speed value of the vehicle, whether the speed value of the vehicle in the time period is less than a second speed threshold, and determining that the second control behavior information is the dangerous behavior information when the speed value of the vehicle in the time period is less than the second speed threshold.

10. A vehicle control apparatus, comprising:
processing circuitry configured to
obtain first control behavior information via a vehicle-mounted sensor system while a vehicle is in an autonomous control mode, the first control behavior information being generated from sensor data that is detected by the vehicle-mounted sensor system based on a first user action performed on the vehicle, wherein the first control behavior information includes at least one of a brake pressure value when the first user action is pressing a brake pedal, an accelerator pressure value when the first user action is pressing an accelerator pedal, and a torsion value when the first user action is turning a steering wheel;
determine that the first control behavior information is a predetermined type of control behavior information when at least one of the brake pressure value is greater than a brake threshold, the accelerator pressure value is greater than an accelerator threshold, and the torsion value is greater than a steering threshold;
switch from the autonomous control mode to a manual control mode in response to the first user action only when determining that the first control behavior information is not the predetermined type of control behavior information, and maintain the autonomous control mode when determining that the first control behavior information is the predetermined type of control behavior information;
determine whether second control behavior information is dangerous behavior information according to the second control behavior information and vehicle running state information; and
start an aided control mode when the second control behavior information is determined to be the dangerous behavior information, wherein
the vehicle running state information includes an angular velocity value of the vehicle, and
the processing circuitry is further configured to
determine, according to the second control behavior information and the angular velocity value of the vehicle, whether the angular velocity value of the vehicle is greater than an angular velocity threshold in a time period, and
determine that the second control behavior information is the dangerous behavior information when the angular velocity value of the vehicle is greater than the angular velocity threshold in the time period.

11. The vehicle control apparatus according to claim 10, wherein
the first control behavior information includes an angle value when the first user action is turning the steering wheel; and
the processing circuitry is further configured to determine that the first control behavior information is the predetermined type of control behavior information when the angle value is greater than an angle threshold.

12. The vehicle control apparatus according to claim 10, wherein
the processing circuitry is further configured to determine that the first control behavior information is the predetermined type of control behavior information when a difference between a braking time point and an acceleration time point is less than a difference threshold; and
a timing of the first user action is the braking time point when the brake pedal is pressed and a timing of a second user action is the acceleration time point when the accelerator pedal is pressed.

13. The vehicle control apparatus according to claim 10, wherein
the processing circuitry is further configured to determine that the first control behavior information is the predetermined type of behavior information when a difference between an acceleration time point and a steering time point is greater than a difference threshold, and a timing of the first user action is the acceleration time point when the accelerator pedal is pressed and a timing of a second user action is the steering time point when the steering wheel is turned.

14. The vehicle control apparatus according to claim 10, wherein
the processing circuitry is further configured to determine that the first control behavior information is the predetermined type of control behavior information when at least one of
the first control behavior information includes the brake pressure value when the first user action is pressing the brake pedal and a variation amplitude of the brake pressure value in a first time period is greater than a variation amplitude of the brake pressure value in a second time period, wherein the second time period is after the first time period; and
the first control behavior information includes a first distance value when the first user action is pressing the brake pedal and a variation amplitude of the first distance value in the first time period is greater than a variation amplitude of the first distance value in the second time period.

15. A non-transitory computer readable storage medium storing instructions which when executed by a processor cause the processor to perform:
obtaining first control behavior information via a vehicle-mounted sensor system while a vehicle is in an autonomous control mode, the first control behavior information being generated from sensor data that is detected by the vehicle-mounted sensor system based on a first user action performed on the vehicle, wherein the first control behavior information includes at least one of a brake pressure value when the first user action is pressing a brake pedal, an accelerator pressure value when the first user action is pressing an accelerator pedal, and a torsion value when the first user action is turning a steering wheel;
determining whether the first control behavior information is a predetermined type of control behavior information when at least one of the brake pressure value is greater than a brake threshold, the accelerator pressure value is greater than an accelerator threshold, and the torsion value is greater than a steering threshold;
switching from the autonomous control mode to a manual control mode in response to the first user action only when determining that the first control behavior information is not the predetermined type of control behavior information, and maintaining the autonomous control mode when determining that the first control behavior information is the predetermined type of control behavior information;
determining whether second control behavior information is dangerous behavior information according to the second control behavior information and vehicle running state information; and
starting an aided control mode when the second control behavior information is determined to be the dangerous behavior information, wherein
the vehicle running state information includes an angular velocity value of the vehicle, and
the determining whether the second control behavior information is the dangerous behavior information includes
determining, according to the second control behavior information and the angular velocity value of the vehicle, whether the angular velocity value of the vehicle is greater than an angular velocity threshold in a time period, and
determining that the second control behavior information is the dangerous behavior information when the angular velocity value of the vehicle is greater than the angular velocity threshold in the time period.

* * * * *